(12) United States Patent
Nimer et al.

(10) Patent No.: US 12,730,046 B2
(45) Date of Patent: Sep. 8, 2026

(54) AUTONOMOUS MECHANICAL PERFORMANCE CHARACTERIZATION OF THREE-DIMENSIONAL ARTICLES ON A BUILD PLATE

(71) Applicant: The Johns Hopkins University, Baltimore, MD (US)

(72) Inventors: Salahudin M. Nimer, Fulton, MD (US); Edwin B. Gienger, IV, Washington, DC (US); Steven M. Storck, Catonsville, MD (US); Andrew M. Lennon, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 432 days.

(21) Appl. No.: 18/451,436

(22) Filed: Aug. 17, 2023

(65) Prior Publication Data

US 2024/0077395 A1 Mar. 7, 2024

Related U.S. Application Data

(60) Provisional application No. 63/403,649, filed on Sep. 2, 2022.

(51) Int. Cl.
*G01N 3/20* (2006.01)
*G01N 3/02* (2006.01)
(Continued)

(52) U.S. Cl.
CPC ................. *G01N 3/20* (2013.01); *G01N 3/02* (2013.01); *G01N 3/22* (2013.01); *G01N 3/24* (2013.01); *G01N 3/32* (2013.01)

(58) Field of Classification Search
CPC ...... G06F 30/17; G06F 17/5018; G06F 30/23; G05B 13/048; G05B 19/4099; B22F 8/00; B22F 3/1055; B22F 10/20; B22F 12/00; B22F 1/0007; B22F 1/12; B22F 10/38; B22F 12/30; B22F 10/28; B22F 10/80; B22F 3/18; B22F 10/85; B22F 10/25; B22F 10/64; G01N 3/18; G01N 3/08; B81B 7/02; C22C 19/056; C22C 30/00; C22C 33/0285; C01B 32/15; B29C 64/10; B29C 64/379; G06T 7/0002; B33Y 10/00; B33Y 80/00; B33Y 50/02; B33Y 50/00; B23K 15/0086; B23K 26/342
See application file for complete search history.

(56) References Cited

U.S. PATENT DOCUMENTS 11,002,649 B1 * 5/2021 Boyce ...................... G01N 3/04
2020/0166443 A1 * 5/2020 McCarty, II ........... G01N 21/88

* cited by examiner

*Primary Examiner* — Brandi N Hopkins
(74) *Attorney, Agent, or Firm* — Sung T. Kim

(57) ABSTRACT

A process for autonomous mechanical property testing of specimens on a build plate includes fabricating a plurality of the specimens on a build plate, wherein each of the specimens comprises an upper portion and a lower portion integral to the build plate. Each of the upper portions of the specimens on the build plate are sequentially engaged with an end effector on a terminal end of a multi-linked robotic arm, wherein the end effector is configured to engage the upper portion and apply a uni- or multi-modal load, wherein intermediate the end effector and the multi-linked robotic arm comprises a multi-axis load cell for measuring an applied load. The process further includes autonomously calculating one or more mechanical properties from the applied load.

20 Claims, 7 Drawing Sheets

(51) Int. Cl.

| | |
|---|---|
| ***G01N 3/08*** | (2006.01) |
| ***G01N 3/22*** | (2006.01) |
| ***G01N 3/24*** | (2006.01) |
| ***G01N 3/32*** | (2006.01) |
| ***G01N 35/00*** | (2006.01) |

AUTONOMOUS MECHANICAL PERFORMANCE CHARACTERIZATION OF THREE-DIMENSIONAL ARTICLES ON A BUILD PLATE

CROSS-REFERENCE TO RELATED APPLICATIONS

The present application claims priority to and filing benefit of U.S. Provisional Patent Application No. 63/403,649, filed on Sep. 2, 2022, which is incorporated by reference herein in its entirety.

BACKGROUND

The present disclosure generally relates processes and systems for autonomous mechanical characterization of three-dimensional articles manufactured on a build plate.

Multiple three-dimensional articles of a variety materials can be fabricated on a build plate in a variety of ways. For example, additive manufacturing (AM) processes are often used to form complex shapes, which generally includes a sequential layer by layer build-up of a three-dimensional object of any shape from a design. Other processes such as injection molding of thermoplastic materials, casting of metal articles, and the like can be used to integrally form these articles directly on the build plate.

By way of example, in a typical AM process, a two-dimensional image of a first layer of material such as a metal, ceramic, and/or polymeric material is formed, and subsequent layers are then added one by one until such time a three-dimensional article is formed. Typically, the three-dimensional article is fabricated using a computer aided design (CAD) model.

Exemplary additive manufacturing processes include, among others, Fused Deposition Modeling (FDM), wherein a plastic filament is heated and extruded through a nozzle to create the object layer by layer; Stereolithography (SLA), wherein a liquid resin is cured by a UV laser to create the object layer by layer; Selective Laser Sintering (SLS), wherein a laser is used to sinter a powder material, such as nylon or metal, to create the object layer by layer; Binder Jetting, wherein a binder is jetted onto a powder bed material to create the object layer by layer; Direct Energy Deposition (DED), wherein a high-energy source, such as a laser or electron beam, is used to melt and deposit the material to create the object layer by layer; and the like.

In AM processing of metals, for example, a typical feedstock is a powdered metal or wire composition of one or more metals, which is sintered or fully melted by the energy input of a laser or electron beam. As a result, the powdered metal composition is transformed layer by layer into a solid three-dimensional part of nearly any geometry. The most popular AM processes for metals include laser beam melting, electron beam melting, and laser beam deposition. During AM processing, the metal powder or wire is subjected to a complex thermal cycle that includes rapid heating above the melting temperature of the respective metal due to energy absorption from the laser (or electron beam) and its subsequent transformation into heat to form a molten metal followed by rapid solidification after the heat source has moved on. Complex physics of the melt solidification combine with millions of parameters of options makes it nearly impossible to predict properties without rapid screening techniques. The AM process further includes numerous re-heating and re-cooling steps when subsequent layers are added to the evolving three-dimensional structure, which further adds to the complexity of the process.

Thermoplastics and ceramics can also be used to form three dimensional additively manufactured components from powdered feedstocks that are subsequently melted and/or fused together using a laser to form the three-dimensional component layer by layer. In a somewhat similar manner, AM processing can extend to polymerization reactions, which generally include providing a monomer feedstock including a photo or thermal initiator that can be in the form of powder or liquid that undergoes polymerization by exposure to a suitable activating radiation source. As a result, the feedstock is transformed layer by layer into a solid three-dimensional part of nearly any geometry.

Mechanical testing of components plays an important role in understanding the complex relationships between basic process parameters, defects, and the final product of the particular process utilized during fabrication. Current testing of mechanical properties such as tensile testing, fatigue testing, torsion testing, fracture toughness, and the like, is most often performed per ASTM standards. Testing of these mechanical properties are crucial for determining the various performance parameters for the intended component to be produced. Regarding tensile behavior, force, displacement, and strain can be measured, and the corresponding stress-strain characteristics plotted. Generally, properties like yield strength, peak tensile stress, elongation, and elastic modulus are determined to understand the mechanical behavior under loading conditions.

ASTM E8 and ASTM A370 are the most common test standards for determining the tensile properties of metallic materials, which can be used to measure elastic modulus, yield strength, yield point elongation, peak tensile stress, and reduction of area, among other properties. Although these tests allow for different specimen types and define suitable geometries and dimensions for each one, the tests nevertheless require independent manufacture of a particular test coupon of exacting dimensions and also requires the operator to manually handle the test coupon for placement into and operation of the appropriate testing machine. For example, for tensile strength measurements, one of the more common specimen types can be characterized as being a dog bone-shaped rectangle with a width of 6 millimeters (mm) and a gauge length of 25 mm. Once the specimen type is manufactured to precise dimensions defined by the standard being followed, the specimen is then independently handled and placed by the operator within the tensile testing machine so that tensile properties can be measured via a uniaxial load frame. As such, the ASTM standards for tensile testing require fabrication of a specific specimen type having a particular geometry and dimensions (i.e., a test coupon) that is independent from the build plate (i.e., physically removed from the build plate) so that the specimens can be hand-carried by the operator and manually tested in the tensile testing machine. One of the problems associated with tensile testing in this manner as well as for other types of standardized mechanical testing is the time required to independently fabricate the specimen type to the configuration defined by the testing standard and the operator time required to use the tensile testing equipment. Each test coupon must be independently inserted into the mechanical testing machine, which is relatively inefficient and makes it very difficult to rapidly obtain information regarding the effects of varying processing parameters or inherent variability associated with one or more parameters within the build. Additionally, the fabrication of specimens takes up significant amounts of space, which is highly limited, and, in some instances, requires the use of large volumes of often very expensive powder. Still further, current mechanical testing processes are limited in the number of data sets because of the associated relative inefficiencies of the process.

As noted above, AM processes generally include a sequential layer by layer build-up of a three-dimensional object of any shape from a design, which can be used to form relatively complex geometric shapes that undergo complex stress states. Mechanical property testing as outlined in different standards apply uniaxial loads, which is then used in a model to predict part performance. Because uniaxial loads are applied, the stress states are relatively simple and limit predictive confidence since these simplified stress states are not representative of the complex stress states the AM produced component can experience.

SUMMARY

Disclosed herein are systems and processes for autonomous mechanical testing of additively manufactured components. The autonomous mechanical testing can be robotically implemented using unique end effectors configured to load test each of the additively manufactured specimens while on the build plate, thereby significantly increasing efficiency. In one or more embodiments of the present disclosure, a process for autonomous mechanical property testing of specimens on a build plate includes fabricating a plurality of the specimens on a build plate, wherein each of the specimens comprises an upper portion and a lower portion integral to the build plate. Each of the upper portions of the specimens on the build plate are sequentially engaged with an end effector on a terminal end of a multi-linked robotic arm, wherein the end effector is configured to engage the upper portion and apply a uni- or multi-modal load, wherein intermediate the end effector and the multi-linked robotic arm comprises a multi-axis load cell for measuring an applied load. The process further includes autonomously calculating one or more mechanical properties from the applied load.

In one or more embodiments, a system for autonomous mechanical property testing of specimens includes at least one multi-link robotic arm having multiple degrees of movement including a first end fixedly attached to a non-movable and stationary surface, a second free end including a multi-axis load cell coupled to the second end, and an end effector coupled to the multi-axis load cell. The end effector is configured to sequentially apply a uni- or multi-modal load to each of the specimens while on a build plate. The system further includes a robotic workstation including a controller configured to control the at least one multi-link robotic arm to interrogate specific specimens on the build plate, a storage device for receiving applied load data during the interrogation, and a processor for autonomously calculating mechanical properties from the applied load data.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
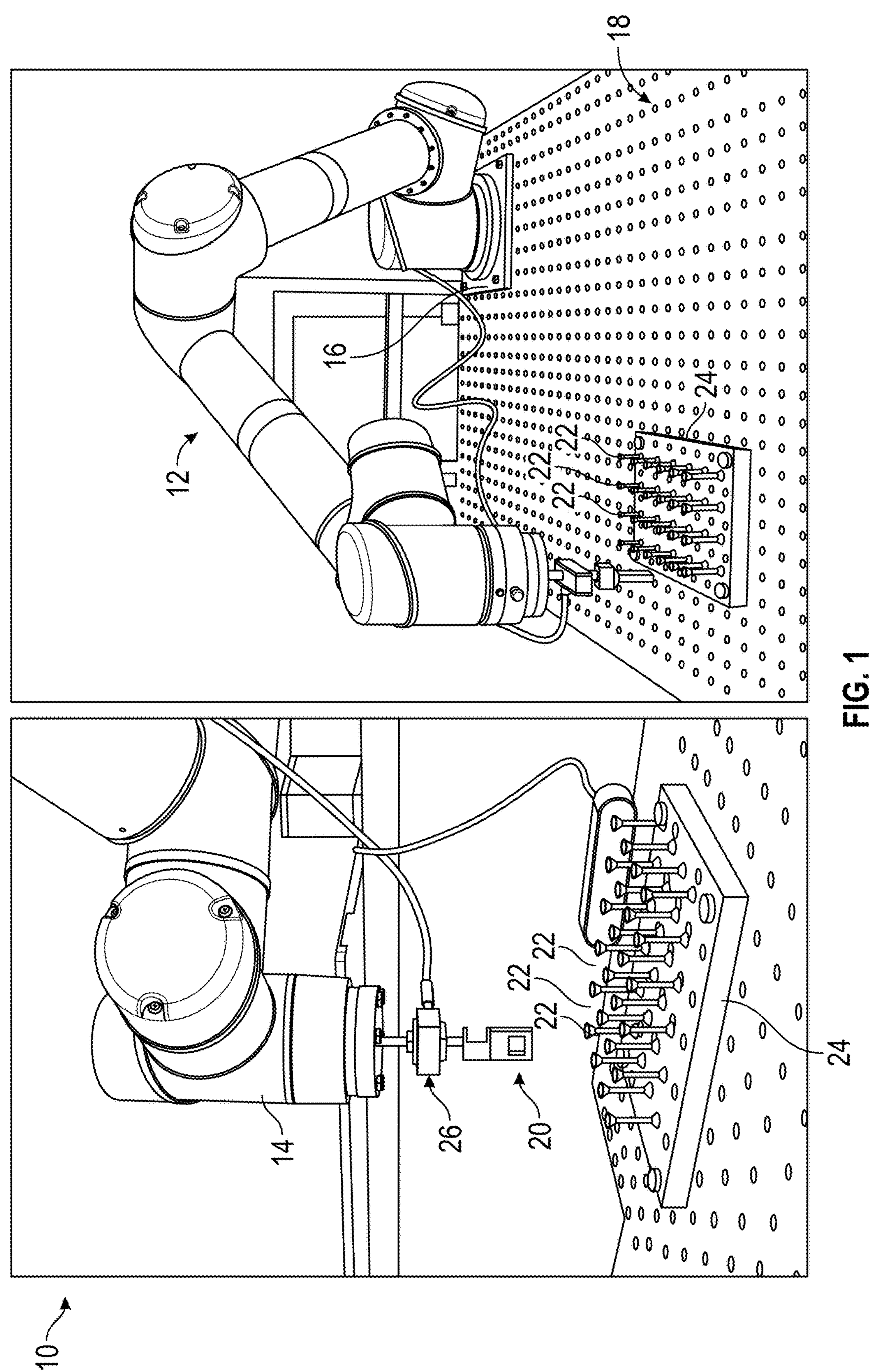
FIG. 1 pictorially illustrates a system including a robotic workstation including a robotic arm and an end effector for autonomous mechanical property testing of integrally fabricated and tested AM specimens while on a build plate in accordance with one or more embodiments of the present disclosure.

The present disclosure is generally directed to systems and processes for autonomous mechanical testing of specimens while coupled to a build plate, which permits rapid and low-cost screening for a variety of mechanical properties. The specimens, materials, and the processes of manufacture are not intended to be limited. For convenience, reference will be made herein to additively manufacturing (AM) specimens given the ease in which complex shapes can be formed. The systems and processes applicable to AM components can be formed of any materials including, but not limited to, metals, ceramics, polymers, and the like integrally fabricated on a flat surface defined by a build plate. Moreover, the autonomous mechanical testing in according with the present disclosure can be obtained for a variety of mechanical properties.

As will be described in greater detail herein, the systems and processes for autonomous mechanical testing of components generally include an instrumented robotic arm including an end effector configured to interact with the components. The end effector is designed to interact with a unique component configuration to provide significant amounts of information rapidly and autonomously about one or more mechanical properties. As such, the test platform will include uniquely shaped test specimens to allow for specific mechanical performance characterization to be measured such as, but not limited to, fatigue resistance, fracture toughness, impact energy absorption, strength, ductility, combinations thereof, and the like, utilising a variety of loading modalities including, but not limited to tension, compression, shear, bending, and the like. The instrumented robotic arm can include a multi-axis load cell intermediate the arm and the end effector to allow for direct mechanical property measurement of the designed specimen geometries. Optionally, the system can further include a vision system such as a digital image correlation vision system or a data acquisition system and camera system integrated with the test platform to visually record local strain and displacement measurement. The systems are configured to autonomously measure the material performance for a variety of different test specimens and is also configured to rapidly process a relatively large number of test specimens that would be impossible to perform in a traditional way, e.g., manually testing each specimen separately from the build plate and requiring operator intervention to manually perform the desired test.

In addition to the above, the systems and processes of the present disclosure can advantageously be used to automatically feed machine learning algorithms enabling the ability to tune any process control parameter to provide optimal material performance. Without the rapidity and large volume sampling provided by autonomous mechanical testing, utilizing machine learning to further optimize the parameter space of an AM process, for example, would likely not be economically feasible or efficient. In addition, the collected data by the autonomous mechanical performance systems and processes herein would be analogous to those obtained using standard testing methods, enabling autonomous determination of design allowables and material qualification for a given application. The systems and processes are also configured to enable local property measurements by designing specimen geometries and programming the robotic arm to interrogate specific locations of the AM specimen while on the build plate. In this manner, the formation of microstructural inhomogeneities, for example, can be rapidly tracked as a function of the processing parameters, material compositions, and/or the like.

In the present disclosure, conventional techniques related to processes for forming the three-dimensional specimens on a build plate may or may not be described in detail herein. Moreover, the various tasks and process steps described herein can be incorporated into a more comprehensive procedure or process having additional steps or functionality not described in detail herein. Various steps in the additive manufacture of three-dimensional articles, for example, are well known and so, in the interest of brevity, many conventional steps will only be mentioned briefly herein or will be omitted entirely without providing the well-known process details. Likewise, the robotic workstations as described herein and conventional techniques related to operating the robotic workstation for autonomous mechanical testing of specimens including the load cells and end effectors may or may not be described in detail herein for similar reasons.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Turning now to FIG. 1, there is depicted an exemplary robotic system 10 for rapid and sequential autonomous mechanical testing for AM specimens on the build plate. The robotic system 10 generally includes a stationary robotic workstation 12 including at least one multi-axis, multi-link robotic arm 14 having one end 16 mounted to a rigid stationary and stable surface 18 and an end effector 20 at the other free end. In the case of multiple robotic arms, each one of the robotic arms can be programmed for different tasks to further improve throughput, e.g., the robotic arms can be configured to provide an assembly line during specimen manufacture and/or testing. In other embodiments, the multiple robotic arms can provide simultaneous mechanical testing to further improve process throughput. Multi-link robotic arms, also known as articulating robotic arms, work by using a series of connected links or segments, which can move relative to one another at specific joints. Each joint in the arm is powered by a motor or actuator, which allows the arm to move in various directions and orientations. The movement of the robotic arm is controlled by a computer program, which sends signals to the motors or actuators to adjust the position and orientation of each joint. By manipulating the joints in different ways, the arm can be programmed to move in a wide range of motions and carry out different tasks. The design of the robotic arm, including the number and arrangement of the links and joints, is not intended to be limited and generally depends on the intended application. For example, small format collaborative robotic arms can be configured to provide a torsional capacity of about 28 to about 150 Newton-meters (Nm). For high strength alloys formed by additive manufacturing, the AM specimen can be configured as a hollow cylinder, wherein calculated torques for various shear stresses assuming an outer radius of 2 millimeters ranges from about 3.4 Nm at a shear stress of about 290 Mega Pascals (MPa) for aluminum alloys, 9.1 Nm at a shear stress of about 720 MPa for titanium alloys, and 15.1 Nm at a shear stress of about 1200 MPa for steels, which is well within the torsional capacity that can be provided by these robotic arms.

The robotic workstation 12 is programmable with a controller (not shown) to move the robotic arm 14 and end effector 20 to a desired location and to actuate the end effector 20 to autonomously perform a desired mechanical test of the AM specimen 22 on a build plate 24. As will be described in greater detail below, a multi-axis load cell 26 is intermediate the end effector 20 and the multi-axis, multi-link robotic arm 14, wherein the end effector 20 is configured to interact with (i.e., interrogate) the AM specimen 22 to perform the mechanical test. For example, the mechanical test may include torsional characterization, wherein the end effector 20 has cross-shaped projection and the top portion of the AM specimen 22 has a complementary recessed cross-shape configured to receive the cross-shaped projection of the end effector 20. Once the end effector 20 is movably positioned by the multi-axis, multi-link robotic arm 14 and coupled to the AM specimen 22, the multi-axis, multi-link robotic arm 14 can be programmed to rotate the end effector 20 and apply a torque, e.g., a twisting load, to the AM specimen. As shown more clearly in FIG. 3, the robotic workstation 12 further includes a data acquisition system 30 for receiving applied load data, and a processor (not shown) for calculating mechanical properties from the applied load data.

A load testing system including the multi-axis load cell 26 intermediate the end effector 20 and robotic arm 14, such as is commercially available from MTS, can be used to measure the mechanical properties such as the torsional force during rotation while measuring the resulting deformation or stress. The multi-axis load cell 26 is a type of sensor that is designed to measure forces and torques in multiple directions or axes simultaneously. These load cells are commonly used in various applications where it is necessary to measure forces or torques acting in multiple directions, such as in robotics, aerospace, and material testing. Unlike traditional load cells that are designed to measure forces or torques in a single direction, multi-axis load cells can measure forces and torques in multiple directions. They typically consist of multiple strain gauges arranged in different directions, and their outputs are combined to provide a measurement of the forces and torques acting in each direction. Multi-axis load cells can be designed to measure forces and torques in two, three, or six axes, depending on the application requirements.

During the test, the end effector 20 applies a load such as a twisting force to the free end of the AM specimen upon engagement of the cross-shaped end effector 20 with the complementary shaped recess on the AM specimen 22 (or vice versa) while measuring the resulting angular rotation or torque in the case of a torsional mechanical property. The relationship between the torque applied and the resulting deformation or stress is used to calculate various torsional properties, such as the torsional strength, torsional modulus, and shear strength. The torsional strength is the maximum torque that the material can withstand before failure, while the torsional modulus is a measure of the material's stiffness in response to torsion. The shear strength is the maximum stress that the material can withstand before it begins to deform permanently. Other mechanical properties can be measured in a similar manner utilising a different applied load.

The load cell 26 converts these forces such as tension, compression, torque or the like into an electrical signal that can be measured and standardized. In one or more embodiments, the multi-axis load cell can have 6 degrees of freedom.

Figure 2:
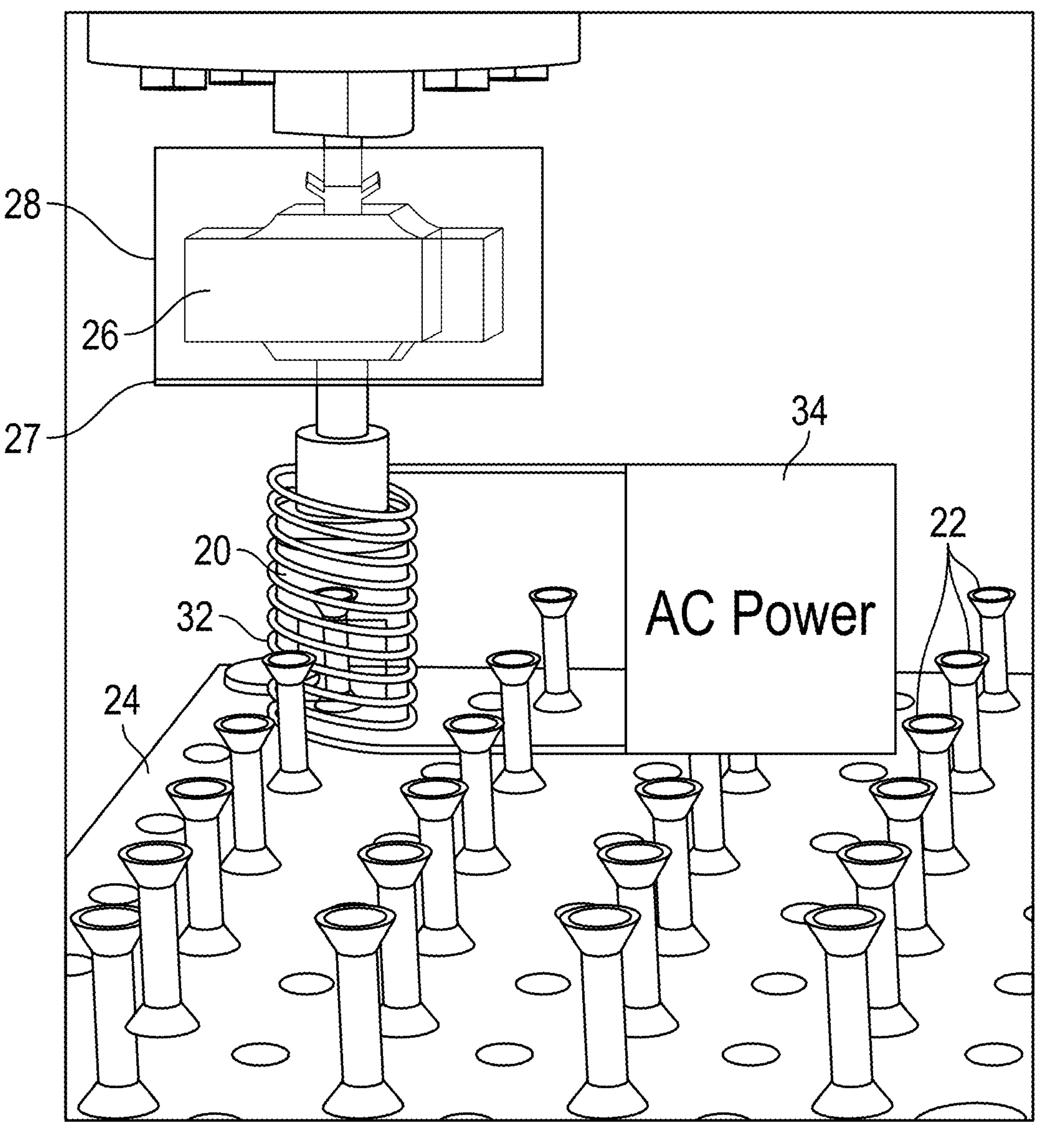
FIG. 2 pictorially illustrates an end effector and load cell for a robotic workstation configured for mechanical property testing of specimens integrally formed on a build plate as a function of temperature in accordance with one or more embodiments of the present disclosure.

In one or more embodiments, the robotic workstation can be configured for autonomously measuring the mechanical properties of AM specimens as a function of temperature performance. As shown in FIG. 2, the load cell 26 can be configured with a water cooling jacket 28 and a thermal break 27 between the load cell 26 and the end effector 20 to provide water cooling as well as insulation during elevated temperature measurement, wherein the end effector 20 is configured with an induction heating coil 32 powered by a AC source 34 that extends about the end effector 20 and envelopes at least a portion of the AM specimen so as to heat the AM specimen to a desired temperature prior to and during the mechanical property testing.

Figure 3:
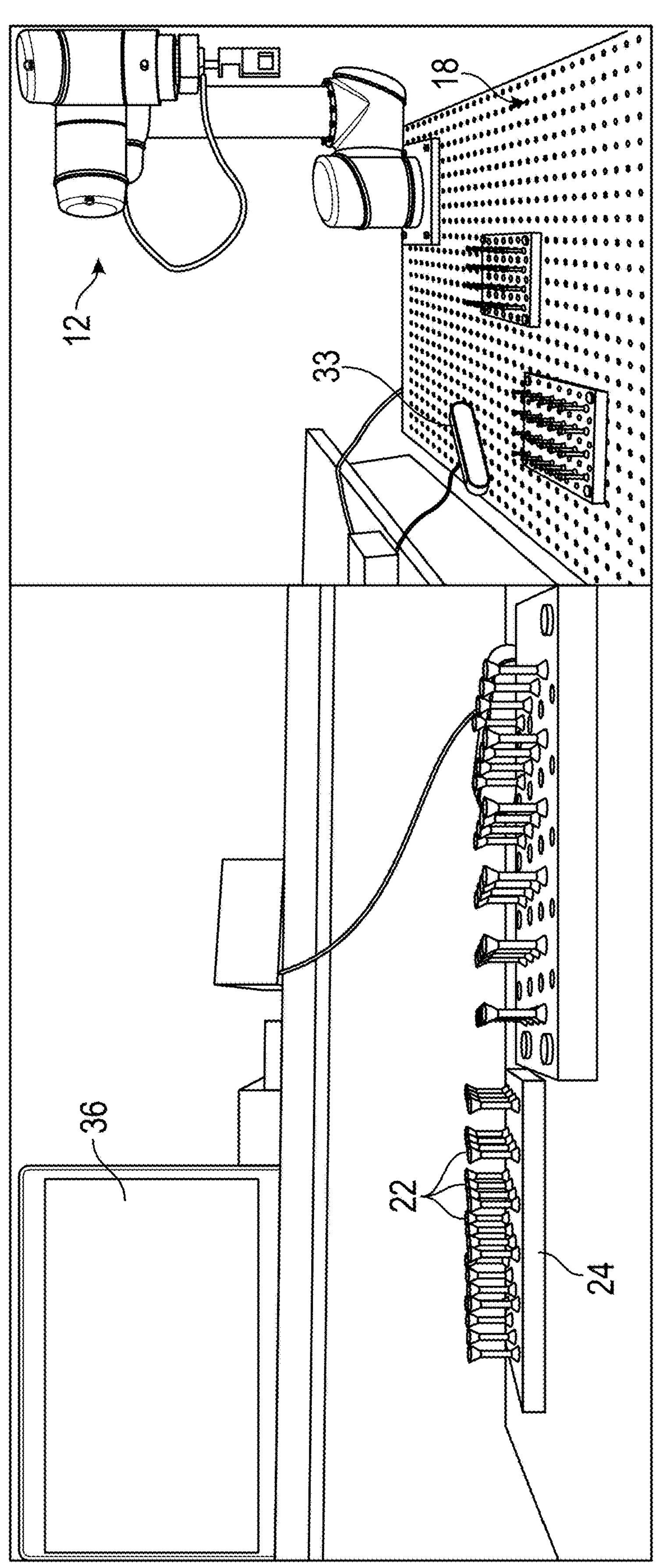
FIG. 3 pictorially illustrates a data acquisition system and webcam for use with the robotic workstation in accordance with one or more embodiments of the present disclosure.

In one or more other embodiments of the present disclosure, the system 10 can further include a vision system such as the data acquisition and webcam system 30 as shown in FIG. 3 for strain and displacement tracking, for locating the location of each specimen, and for autonomously running the correct test sequence as intended. The data acquisition and webcam system 30 provides non-contact optical measurements for analyzing the deformation, displacement and strain of materials and structures while under load. The data acquisition and webcam system 30 generally includes a high-resolution camera 33, usually mounted on a tripod or stand (not shown) coupled to a computer system (not shown) including specialized software that tracks the displacement and deformation of the AM specimen being tested by analyzing the changes in pixel intensities between two or more images captured during the deformation process. The system 30 can further include a monitor 36 for visual observation/inspection by the operator. The analysis software uses image processing techniques to track the movement of the surface features of the specimen. By way of example, a digital image correlation system generally works by dividing the initial image into a grid of small regions called subsets. These subsets are then tracked in the subsequent images to determine their displacement and deformation. By comparing the coordinates of the subsets in the initial and subsequent images, the system can calculate the displacement and deformation of the object. In one or more embodiments, the AM specimen can be coated with a speckle pattern, either manually or robotically, which provides a unique texture for the software to track. The software can calculate the deformation gradient, displacement, and strain fields of the object with high accuracy and precision.

The build plate 24 can include a multitude of spaced apart specimens 22 as shown, which can be arranged in rows and columns although any arrangement is suitable so long as the robotic workstation 12 can be programed to sequentially test the specimens. Several build plates can be positioned within the workstation in order to increase data collection throughput. The build plate 24 is generally formed of a rigid material such as aluminum or the like. In the case of additive manufacturing, each AM specimen 22 can be fabricated using the same parameters and composition as may be desired when using the AM specimens as a proof for qualification or different parameters and/or different material compositions to provide an optimal parameter space to better understand the AM processing space and its effect of morphology and mechanical properties.

Figure 4:
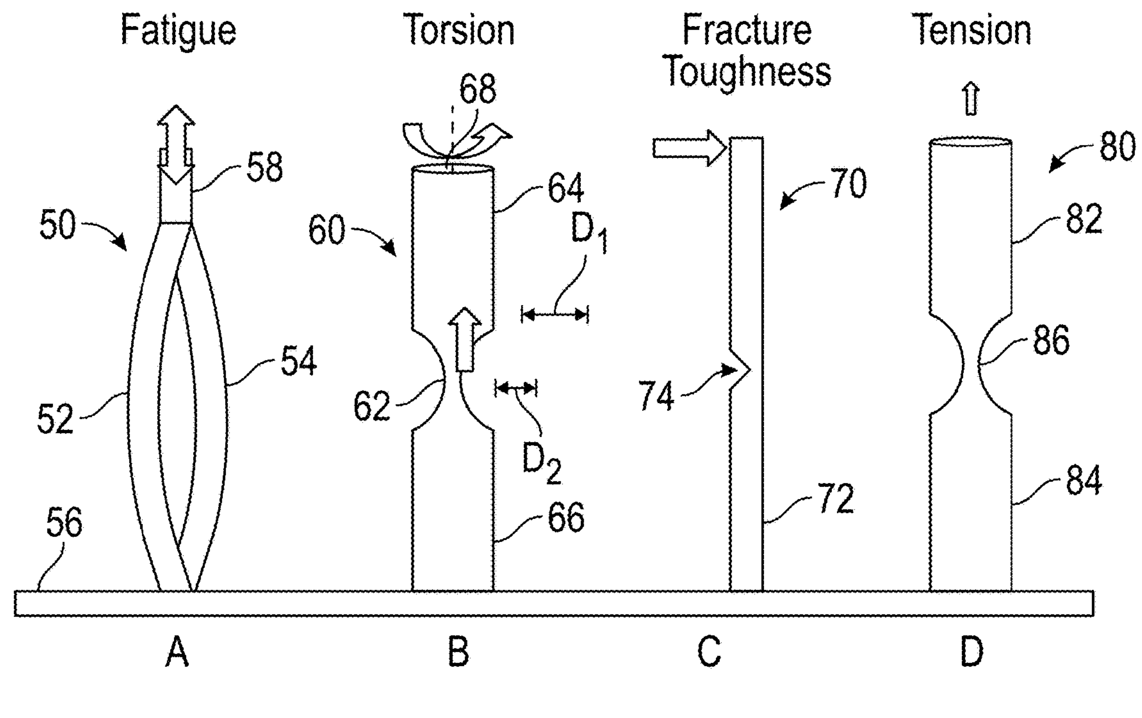
FIGS. 4A-D depict elevational views of various geometries of specimens integrally formed on the build plate for testing various mechanical properties in accordance with one or more embodiments of the present disclosure.

Turning now to FIGS. 4A-D, there are depicted four different exemplary types of AM specimens amenable to different types of mechanical property characterization. The illustrated AM specimens as shown can be autonomously mechanically tested for fatigue as shown in FIG. 4A, torsion as shown in FIG. 4B, fracture toughness as shown in FIG. 4C, and tension as shown in FIG. 4D. These specimens can be fabricated on the same build plate or separate build plates.

Referring to FIG. 4A, fatigue can be mechanically characterized with the AM specimen 50 as shown by subjecting the specimen to multiple cycles of tension and/or compression (e.g., a load of a defined magnitude can be applied followed by a zero load or an opposite load as indicated by the illustrated arrow) until the test is complete or fatigue failure occurs, i.e., initial crack formation, slow crack growth, and rapid crack growth occurs. The rate of crack growth can also be measured. The AM specimen 50 generally includes a pair of elliptically arranged elongated members 52, 54 extending from a build plate 56 and a stem 58, for example, at a terminal end, wherein the end effector of the robotic arm can include a clamp, for example, configured to engage the stem 58 during the mechanical property testing. It should be apparent that other shapes and forms of the AM specimen can be made and tested for fatigue testing.

In one or more embodiments, the end effector can be configured with a hydraulic actuator to effect oscillation during the mechanical testing. The resulting fatigue data can generally be used to determine stress-life or strain-life for a given AM specimen produced by specific parameters with the additive manufacturing process and of a defined composition while on the build plate. It should be apparent that because the build plate can include multiple AM specimens fabricated using different parameters and/or different material compositions, process and material optimization based on the resulting fatigue properties can be readily determined. Moreover, the build plate can include one or more configurations of the AM specimens to autonomously test multiple mechanical properties. Moreover, the AM specimens can be configured to provide more complex stress states by mixing mode loading, which in some applications can be beneficial for generating representative stress states for complex geometries.

In FIG. 4B, there is depicted to an exemplary AM specimen 60 configured to for measuring the torsional mechanical properties. The AM specimen 60 generally includes a cylindrical body having upper and lower portions 64, 66, respectively, including a first diameter (D1) that tapers to a second diameter (D2) at about a midpoint of a height dimension of the cylindrical body to define a gauge section 62. The lower portion 66 is integral to the build plate 56 and the upper portion 64 includes a surface 68 rotatably engageable with the end effector. Rotation of the end effector can be used to measure the torsional properties for a given AM specimen in the manner as previously described. In the narrower circular diameter mid-section of the AM specimen, the resultant shear stress can be measured.

In FIG. 4C, an AM specimen 70 is configured to provide measurement of fracture toughness properties. The AM specimen 70 generally includes an elongated rectangular shaped member 72 extending from the build plate including a notch 74 of defined dimensions. The end effector is configured to provide a lateral force to a top portion of the specimen as indicated by the arrow. The testing involves creating a small crack in a specimen of the material and then applying a controlled amount of force or stress to the specimen. The force is gradually increased until the crack grows or the specimen fractures completely. During the test, the amount of force required to propagate the crack is measured, along with the crack length at various stages. This information is used to calculate the material's fracture toughness, which is typically expressed as the critical stress intensity factor (K_IC) or critical strain energy release rate (G_IC) required for the material to fracture.

In FIG. 4D, an AM specimen 80 is configured to provide measurement of the tension properties. The AM specimen 80 generally has a dog bone shape having planar major surfaces as is commonly utilized in standardized tension tests. The AM specimen as shown has a shoulder 82 and 84 at each end and a narrower gauge section 86 in between, which causes a stress concentration to occur in the middle when the specimen is loaded with a tensile force as indicated by the arrow. Shoulder 84 of the AM specimen extends from the build plate. Tension is a loading mode referring to application of a pulling force on a material. To measure the tension properties of a material, the end effector is configured to clamp, mate, or otherwise interface onto the shoulder 82 of the AM specimen and apply a tensile force in the direction as indicated by the arrow until it breaks or fractures. During the test, the displacement on a specimen is gradually increased, and the force or strain that the material undergoes is measured. Tension tests can provide important information about the strength, ductility, and stiffness of a material. The results of these tests can be used to determine the material's yield strength, and peak stress, which is the maximum stress that the material can withstand before it fractures. Ultimate tensile strength (UTS) specifically refers to ductile materials, i.e., materials that reach a peak and then slowly decrease in force until fracture. The present disclosure can provide an understanding of the behavior of both ductile as well as brittle materials (where the force increases to a peak then catastrophically fails with no reduction in force after the peak). The test can also provide information about the material's elongation, and modulus of elasticity.

Figure 5:
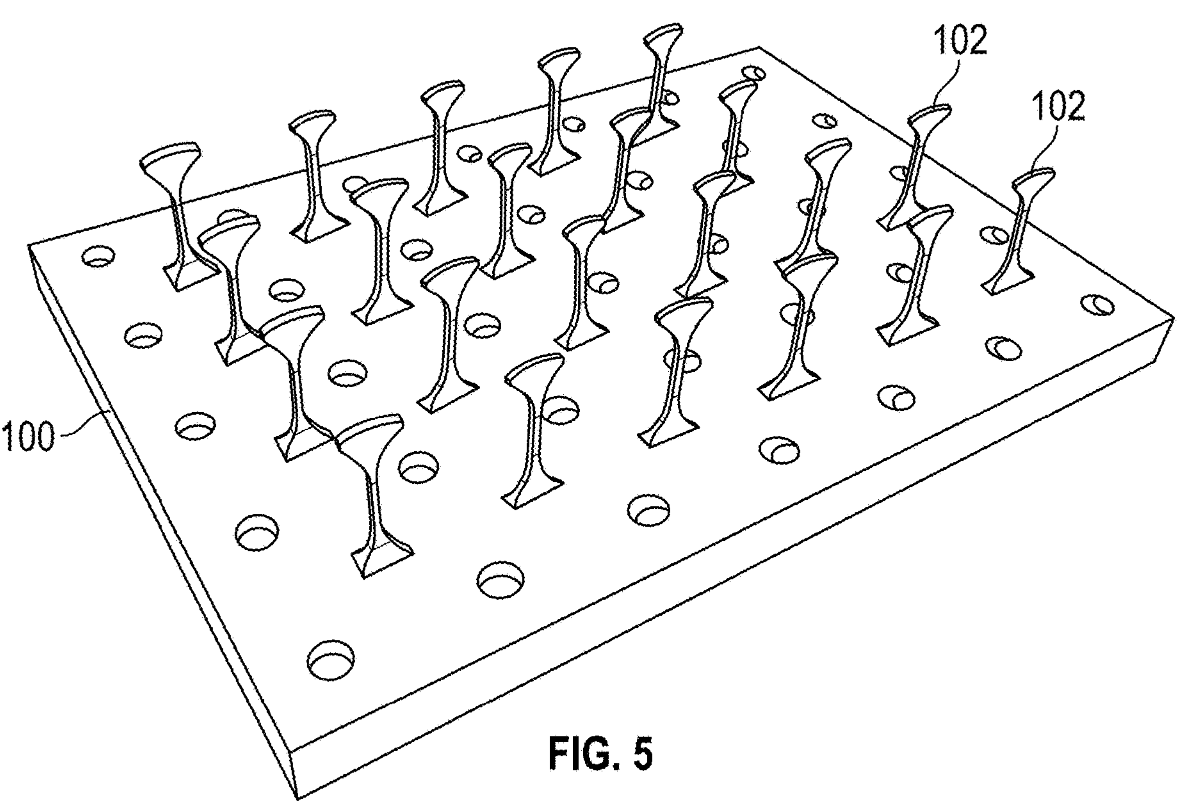
FIG. 5 illustrates a perspective view of a plurality of specimens integrally fabricated on a build plate in accordance with one or more embodiments of the present disclosure.

FIG. 5 pictorially illustrates an exemplary build plate 100 including a plurality of specimens 102 configured for tension testing arranged in rows and columns. Each specimen 102 can be fabricated using the same parameters as may be desired when using the specimens as a proof for qualification or different parameters to provide an optimal parameter space for a certain design property. Although the illustrated specimens 102 are all the same and configured for tensile testing, different geometries/designs of the specimens can be provided on the same build plate for mechanical testing of different properties. The end effector is configured to engage the specimens in a reproducible way to accurately measure the tension properties for the specimens.

Figure 6:
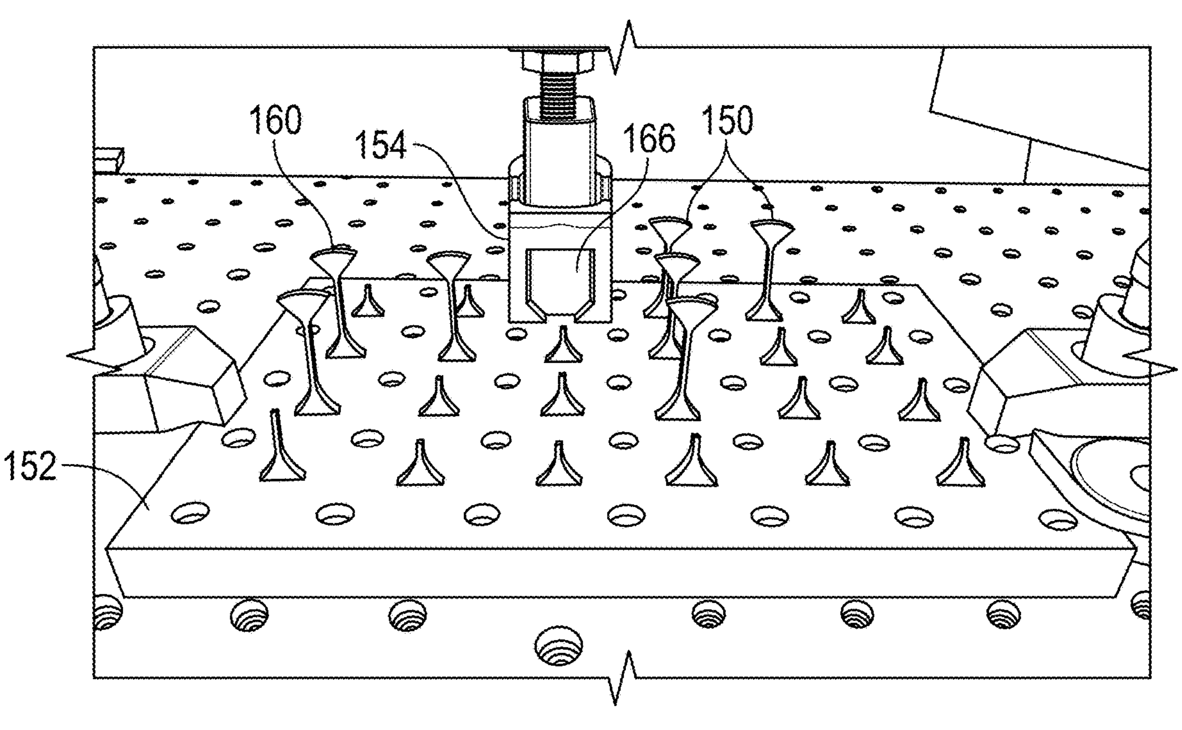
FIG. 6 illustrates a perspective view of a plurality of additively manufactured specimens fabricated on a build plate and an end effector configured to mechanically test the additively manufactured specimens in accordance with one or more embodiments of the present disclosure.

FIG. 6 pictorially illustrates perspective views of exemplary AM specimens 150 fabricated on a rigid build plate 152 that were subjected to tension testing and an end effector 154 coupled to a load cell and robotic arm (not shown) that is configured to provide a tensile force. Tensile properties were measured for two build plates, each including 24 AM specimens. All AM specimens were tested to failure. The end effector 154 include a recessed cavity 166 having a shape complementary to the upper wedge geometry 160.

During testing, the build plate 152 can be fixedly mounted to a non-movable stable surface from which the robotic arm could also be mounted. The robotic arm is programmed to guide the end effector 154 to each AM specimen 150 such that the upper wedge geometry 160 is inserted into the end effector recessed cavity 166 followed by the robotic arm providing a tensile force in an upward direction. Referring to the enlarged perspective views of the AM specimens shown in FIG. 7, the AM specimens 150 included upper and lower wedge geometries 160 162, respectively, with a relatively narrow-gauge section 164 therebetween, which causes a stress concentration to occur in the middle when the AM specimen 150 was loaded with a tensile force. The AM specimens had a height of 25 millimeters (mm), a thickness of 1 mm, and a gauge section thickness of 1 mm.

Figure 7:
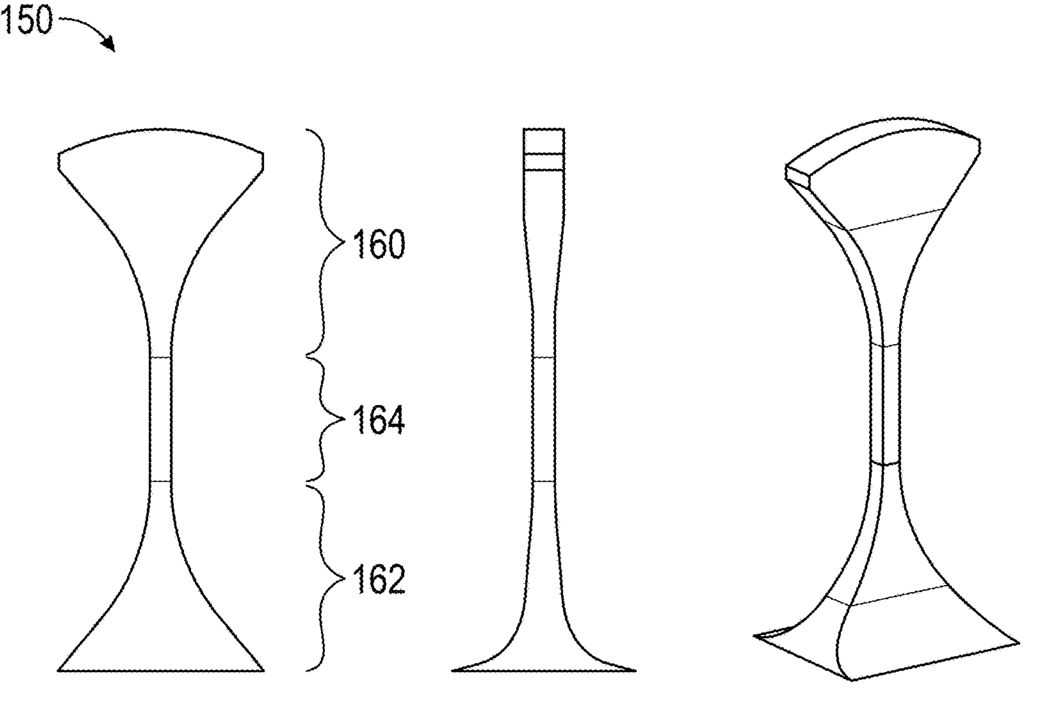
FIG. 7 illustrates enlarged perspective views of one of the additively manufactured specimens fabricated on the build plate in FIG. 6 in accordance with one or more embodiments of the present disclosure.

The testing of the 48 AM specimens of FIG. 7 using the robotic system took 72 seconds. At comparable displacement rates, testing these 48 specimens would result in at least a 5× improvement in testing efficiency over current methodologies. The system can test continuously, around the clock such that testing one thousand tests in this manner would take about 50 hours, whereas a human operator would likely take about 31×8-hour business days. Position control of the system was successful as evidenced by the rapidity of the testing. It should be evident that further reductions in testing times can be provided by optimizing the system, e.g., use of multiple robotic arms.

These results validate that robotic autonomous mechanical property testing is a viable pathway for rapidly testing various mechanical properties of the AM specimens not previously possible. The AM specimens and the configuration of the end effector can be configured for substantially any one or combinations of mechanical property tests. With regard to material development, the autonomous and rapid testing of mechanical properties allows exploration of different compositions, sampling of a large AM parameter space, and geometries having a tuned response.

Figure 8:
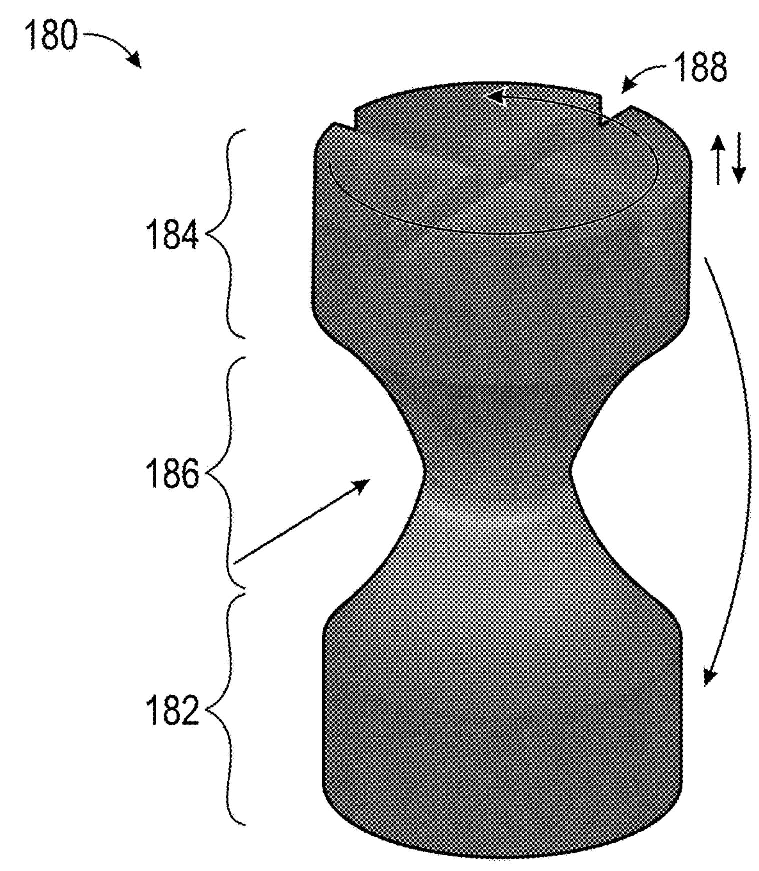
FIG. 8 illustrates a perspective view of an exemplary additively manufactured specimen having a geometry suitable for multi-modal mechanical testing in accordance with one or more embodiments of the present disclosure.

Referring now to FIG. 8, there is depicted an exemplary AM specimen 180 including a geometry suitable for multimodal mechanical testing. The AM specimen 180 includes a cylindrical body including a base portion 182 integral to the build plate (not shown), an upper portion 184, and a tapered and narrower gauge section 186 intermediate the base and upper portions. The upper portion 184 includes a cross hatch-shaped recess 188. The AM specimen 180 further includes a hollow cylindrical opening (not shown) extending between the upper and lower base portion. The end effector is configured to interrogate the AM specimen to provide torque, tension, compression, and/or bending loading modes, which are all possible as indicated by the arrows. Advantageously, the AM specimen geometries can be readily designed for uni- or multi-modal mechanical property testing, wherein the desired geometry is substantially limitless unlike standard driven testing methods that require exacting and limited dimensions for uniaxial mode testing. Likewise, the end effector can be readily configured to be interchangeable with the robotic arm and the geometry of the AM specimens to provide the desired uni- or multimodal property testing for large specimen sizes.

Figure 9:
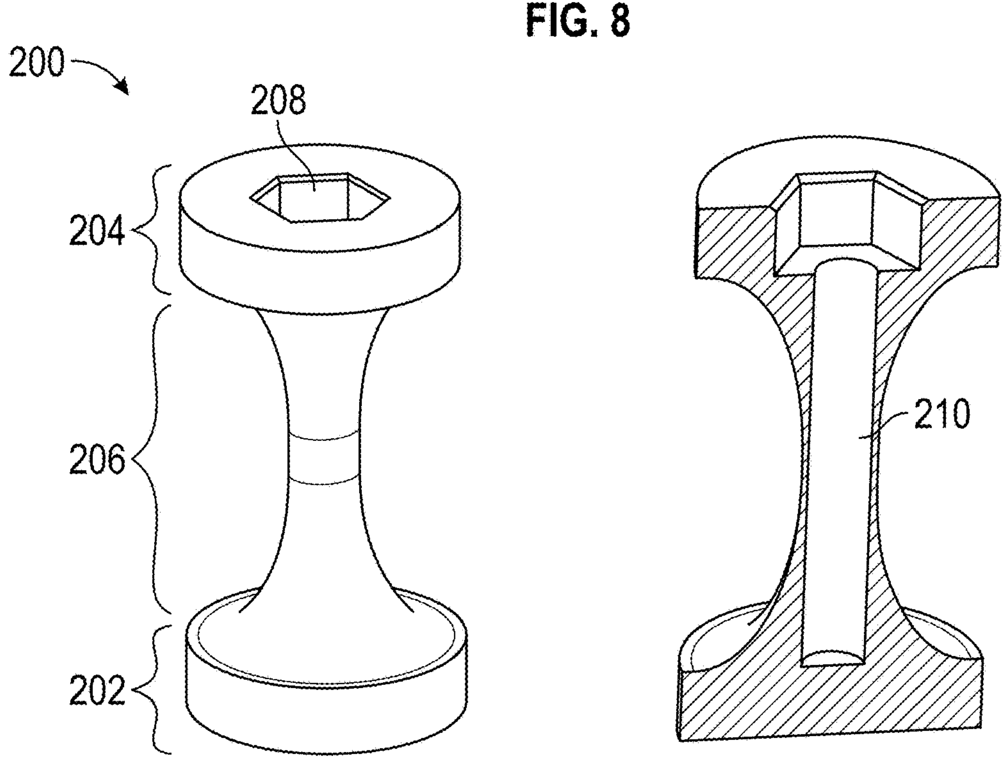
FIG. 9 illustrates a perspective view of an exemplary additively manufactured specimen in accordance with one or more embodiments of the present disclosure.

FIG. 9 depicts another exemplary AM specimen 200 having a geometry configured primarily for torsional measurement. The AM specimen 200 includes a cylindrical body including a base portion 202 integral to the build plate, an upper portion 204, and a tapered and narrower gauge section 206 intermediate the base and upper portions. The upper portion 204 includes a polygonal-shaped recess 208, e.g., hexagonal-shape. The AM specimen further includes a hollow cylindrical opening 210 extending from the polygonal-shaped recess 208 to the base portion 202.

Figure 10:
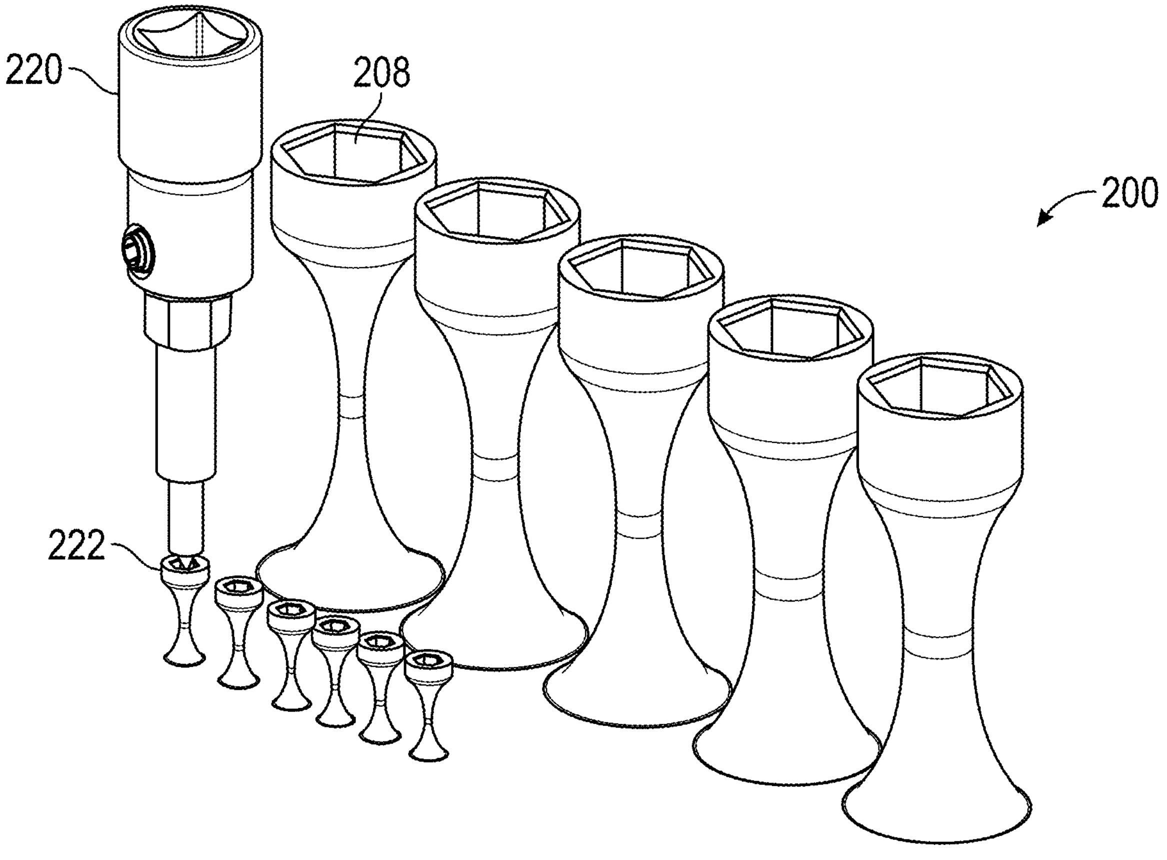
FIG. 10 illustrates a perspective view of an exemplary additively manufactured specimen and end effector configured to engage the additively manufactured specimen for mechanical testing in accordance with one or more embodiments of the present disclosure.

In FIG. 10, an end effector 220 suitable for mechanically interacting with the AM specimen 200 of FIG. 9 is depicted. The end effector can include a complementary-shaped polygonal projection 222 that can be robotically inserted into the complementary polygonal-shaped recess 208 of the AM specimen 200 and subsequently rotated, bent, compressed and/or the like.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A process for autonomous mechanical property testing of specimens on a build plate comprising:

fabricating a plurality of the specimens on a build plate, wherein each of the specimens comprises an upper portion and a lower portion integral to the build plate;

sequentially engaging each of the upper portions of the specimens on the build plate with an end effector on a terminal end of a multi-linked robotic arm, wherein the end effector is configured to engage the upper portion and apply a uni- or multi-modal load, wherein intermediate the end effector and the multi-linked robotic arm comprises a multi-axis load cell for measuring an applied load; and autonomously calculating one or more mechanical properties from the applied load.

2. The process of claim 1, wherein the applied load comprises a tensile force, torsional force, a compressive force, a shear force, and combinations thereof.

3. The process of claim 1, wherein the specimens are fabricated with different processing parameters on the build plate.

4. The process of claim 1, wherein the specimens are fabricated with the same processing parameters on the build plate.

5. The process of claim 1, wherein the specimens are fabricated with different material compositions.

6. The process of claim 1, wherein the specimens are comprised of metals, ceramics, metal-ceramics, or polymers.

7. The process of claim 1, wherein the specimens comprise a pair of elliptically-shaped elongated members extending from the build plate and including a stem at a terminal free end, and wherein the end effector is configured to oscillate and engage the stem to determine stress-life or strain life from the applied load.

8. The process of claim 1, wherein the specimens comprise a cylindrical body including a lower portion integral to the build plate, an upper portion, and a tapering gauge section intermediate the upper and lower portions having a diameter less than the upper and lower portions, and wherein the end effector is configured to at least rotationally engage the upper portion to provide an applied load comprising a torsional force to the specimen being tested.

9. The process of claim 1, wherein the specimens comprise an elongated member integrally extending from the build plate, wherein the elongated member including a notch at about a midpoint, and wherein the end effector is configured to provide a lateral force on a surface defining the notch as the applied load.

10. The process of claim 1, wherein the specimens comprise an elongated member including a lower wedge portion integrally extending from the build plate, an upper wedge portion, and a narrower linear gauge section extending therebetween, and wherein the end effector is configured to engage the upper wedge portion and apply a tensile force as the applied load.

11. The process of claim 1, wherein the specimens on the build plate have different geometries for different mechanical property measurements.

12. The process of claim 1, further comprising viewing displacement and/or deformation during the mechanical property testing with a digital image correlation vision system.

13. The process of claim 1, wherein sequentially engaging each of the upper portions of the specimens on the build plate with the end effector comprises configuring the end effector with a projectable surface and each of the upper portions of the specimens with a complementary shaped recess engageable with the projectable surface and configured to provide a desired modality of the applied load.

14. The process of claim 1, further comprising applying machine learning from the applied load data and further optimizing a parameter space and/or a material space for the specimens.

15. The process of claim 1, wherein sequentially engaging each of the upper portions of the specimens on the build plate with the end effector comprises configuring the end effector with a recessed surface and each of the upper portions of the specimens with a complementary shaped projecting surface engageable with the projectable surface and configured to provide a desired modality of the applied load.

16. The process of claim 1, wherein the specimens are fabricated layer by layer on the build plate by a process comprising fused deposition modeling, stereolithography, selective laser sintering, binder jetting, or direct energy deposition.

17. The process of claim 1, wherein the specimens are additively manufactured layer-by-layer.

18. A system for autonomous mechanical property testing of specimens, the system comprising:

at least one multi-link robotic arm having multiple degrees of movement including a first end fixedly attached to a non-movable and stationary surface, a second free end comprising a multi-axis load cell coupled to the second end, and an end effector coupled to the multi-axis load cell, wherein the end effector is configured to sequentially apply a uni- or multi-modal load to each of the specimens while on a build plate; and a robotic workstation comprising a controller configured to control the at least one multi-link robotic arm to interrogate specific specimens on the build plate, a storage device for receiving applied load data during the interrogation, and a processor for autonomously calculating mechanical properties from the applied load data.

19. The system of claim 18, further comprising a digital image correlation vision system configured to visually record local strain, deformation, and/or displacement.

20. The system of claim 18, further comprising a water-cooling jacket about the load cell, a thermal break between the load cell and the end effector, and an induction heating coil powered by a power source extending about the end effector and configured to envelope at least a portion of a selected one of the specimens during the interrogation to heat the specimens to a desired temperature.

* * * * *